United States Patent [19]

Koizumi et al.

[11] Patent Number: 4,888,683

[45] Date of Patent: * Dec. 19, 1989

[54] METHOD AND APPARATUS FOR LOADING PROGRAMS IN A DISTRIBUTED PROCESSING SYSTEM

[75] Inventors: Minoru Koizumi; Kinji Mori, both of Yokohama; Yasuo Suzuki, Ebina; Katsumi Kawano, Fuchu; Masayuki Orimo, Kawasaki; Hirokazu Kasashima, Hitachi; Kozo Nakai, Katsuta, all of Japan

[73] Assignee: Hitachi, Ltd., Tokyo, Japan

[*] Notice: The portion of the term of this patent subsequent to Nov. 15, 2005 has been disclaimed.

[21] Appl. No.: 255,251

[22] Filed: Oct. 11, 1988

Related U.S. Application Data

[63] Continuation of Ser. No. 929,914, Nov. 13, 1986, Pat. No. 4,785,397.

[30] Foreign Application Priority Data

Nov. 15, 1985 [JP] Japan ................................ 60-254759

[51] Int. Cl.⁴ .............................................. G06F 1/00
[52] U.S. Cl. ................................. 364/200; 364/228.3; 364/229; 364/229.3; 364/236.2; 364/248.1
[58] Field of Search ........................ 364/200, 300, 900

[56] References Cited

U.S. PATENT DOCUMENTS 4,752,870 6/1988 Matsumura ........................ 364/200
4,785,397 11/1988 Koizumi et al. .................... 364/200

FOREIGN PATENT DOCUMENTS 0106213 4/1984 European Pat. Off. .

OTHER PUBLICATIONS

"Method for Detecting a Copy of a Previously Loaded Program", IBM T.D.B., vol. 28, No. 1, Jun. 1985.

Primary Examiner—Raulfe B. Zache
Attorney, Agent, or Firm—Antonelli, Terry & Wands

[57] ABSTRACT

A system for loading a program in a distributed system including a plurality of information processing units interconnected by a transmission system comprises an information processing unit for preparing a program and sending the program to the transmission system, another information processing unit having means for receiving the program from the transmission system and storing the program in a memory in accordance with a content of the program, and means for retrieving a program based on program structural information, which program corresponds to the program structural information, and sending the retrieved program to the transmission system, and other information processing units each having means for sending the program structural information to the transmission system and means for selecting a corresponding program from the transmission system and loading the selected program in the unit.

5 Claims, 5 Drawing Sheets

| INPUT FC | OUTPUT FC | PROGRAM SIZE | PROGRAM |
|---|---|---|---|
| FC₁ | FC₂ | LP₁ | P₁ |
| FC₂₀ | FC₃₀ | LP₂ | P₂ |
| FC₇ | FC₆ | LP₃ | P₃ |
| ⋮ | ⋮ | ⋮ | ⋮ |
|  |  |  |  |

| INPUT FC | OUTPUT FC |
|---|---|
| FC₂ | FC₃ |
| FC₇ | FC₆ |
|  |  |
|  |  |
|  |  |

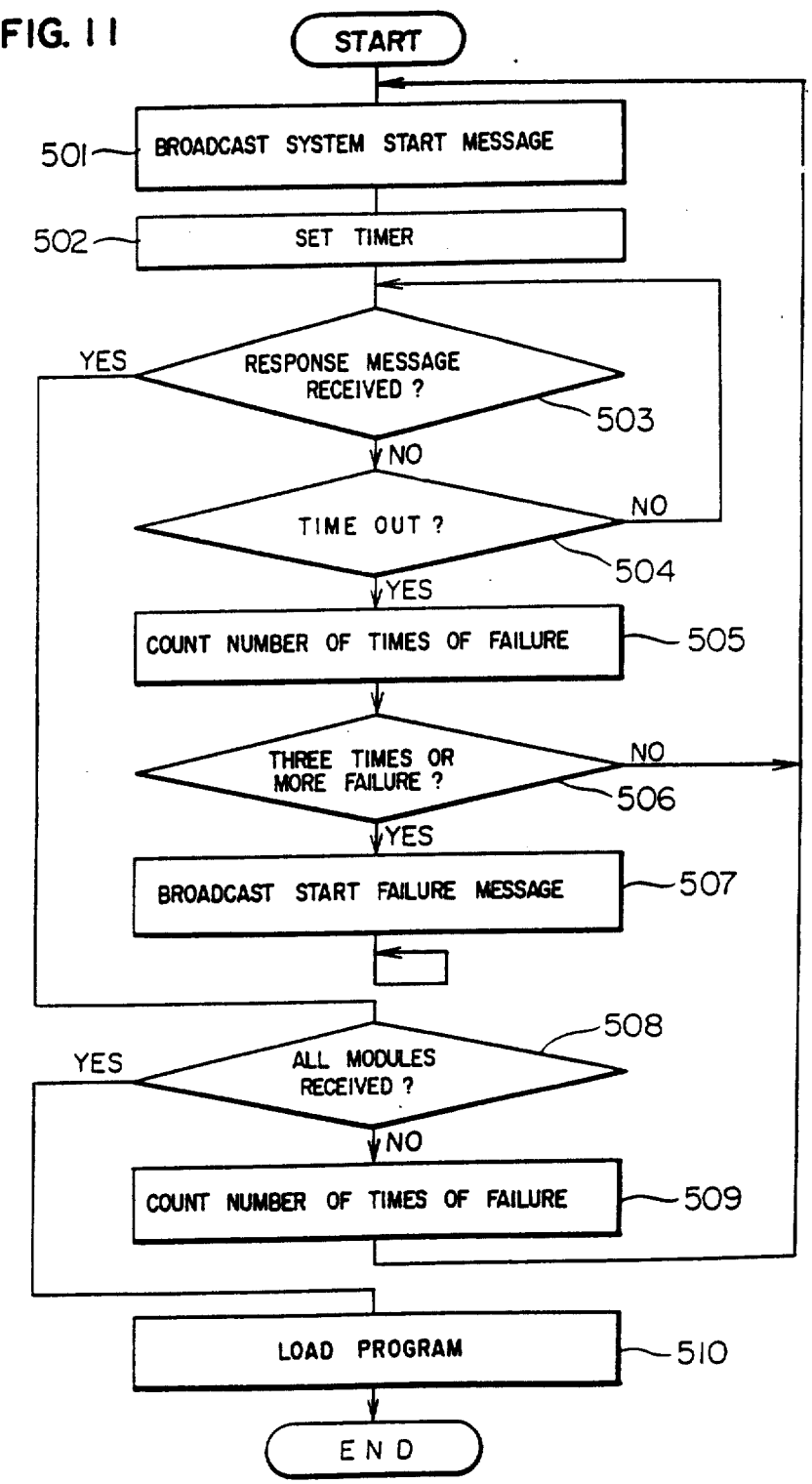

METHOD AND APPARATUS FOR LOADING PROGRAMS IN A DISTRIBUTED PROCESSING SYSTEM

This is a continuation application of Ser. No. 929,914, filed Nov. 13, 1986, which issued on Nov. 15, 1988, as U.S. Pat. Ser. No. 4,785,397.

BACKGROUND OF THE INVENTION

1. Field Of The Invention

The present invention relates to a distributed system comprising a plurality of information processing units interconnected by a data transmission system, and more particularly to a method for program loading by coordination of the distributed information processing units.

2. Description Of The Prior Art

In a prior art distributed system, when a program is to be loaded to subsystems, a subsystem which developed the program function as a master station who grasps a memory map of the subsystems to which the program is to be loaded and directly loads the program to them. Accordingly, if a system configuration changes due to memory allocation of the loading subsystem, or expansion or maintenance of the subsystems, it is impossible to load the program.

SUMMARY OF THE INVENTION

It is an object of the present invention to provide method and system for program loading which permit loading of a latest program to a started subsystem, without requiring a central management device for program loading, in a distributed system in which a system configuration always changes with maintenance, failure or expansion and a program per se also gradually changes by function enhancement.

In order to achieve the above object, the present invention provides a distributed system comprising a plurality of information processing units interconnected by a data transmission system, in which: a program is prepared in one of the information processing units and sent to the data transmission system; the program is received in other one of the information processing units, a content thereof s checked, and the program is stored in a memory; based on a program structural information the corresponding program is retrieved and sent to the transmission system; program structural information of other information processing units is sent to the transmission system; and·a corresponding program is selected from the transmission system and loaded to the information processing unit.

BRIEF DESCRIPTION OF THE DRAWINGS

FIG. 11 shows a process flow chart at the start of the subsystem.

DESCRIPTION OF THE PREFERRED EMBODIMENTS

One embodiment of the present invention is now explained with reference to the accompanying drawings.

Figure 1:
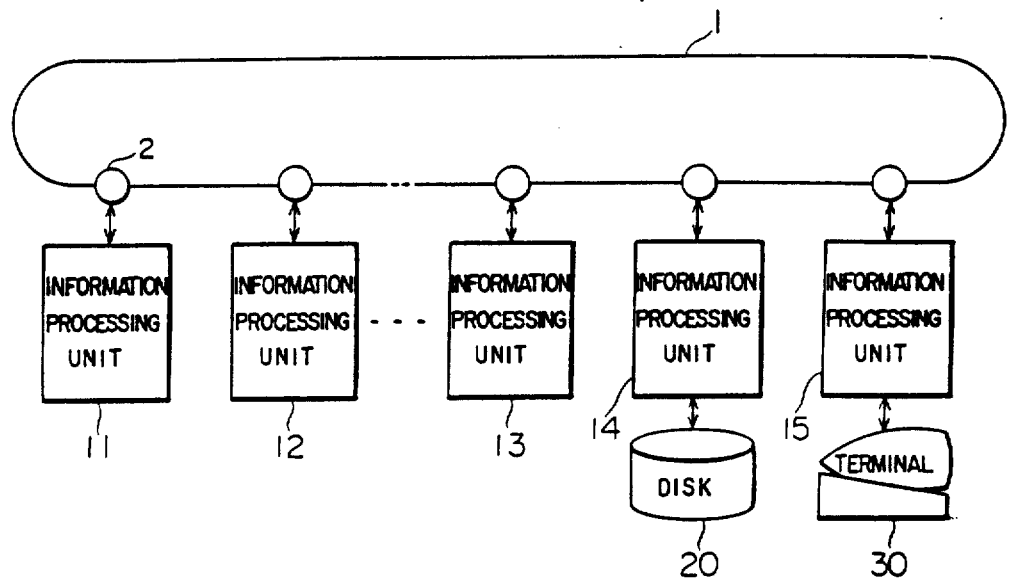
FIG. 1 shows an overall configuration of a system.
Figure 2:
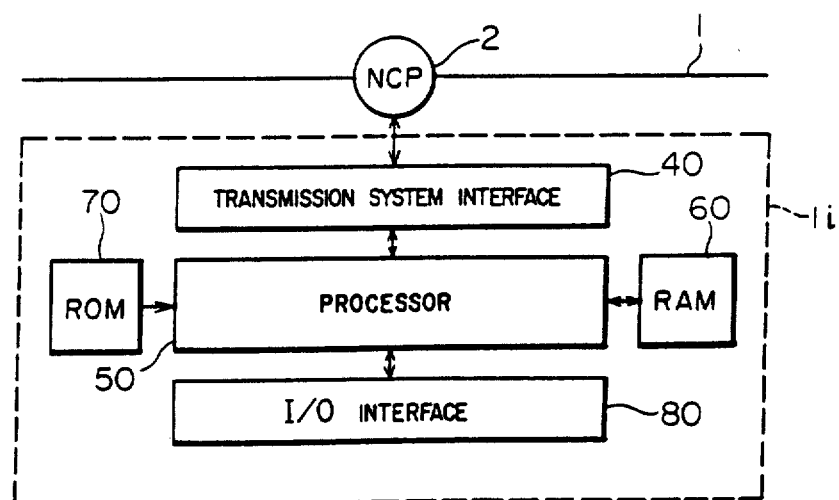
FIG. 2 shows a configuration of an information processing unit which serves as a subsystem.

FIG. 1 shows an overall configuration of a distributed processing system to which the present embodiment is applied. It comprises a loop transmission system 1 and a plurality of information processing units 11, 12, --- 15 connected thereto. As shown in FIG. 2, an i-th information processing unit li comprises a transmission system interface 40 which is an interface to a node control processor (NCP) 2 of the loop transmission system, a processor 50, a RAM 60 for storing programs and data of the processor, a ROM 70 which contains structural information of the information processing unit, and an interface to I/0 devices such as a disk and terminals. A disk device 20 and a terminal device 30 may be connected to the I/0 interface as shown in FIG. 1. The information processing units are interconnected through the transmission system 1 and there is no master-slave relation among the information processing units and they process asynchronously to each other.

Figure 3:
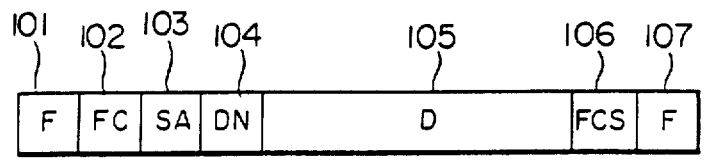
FIG. 3 shows a format of a message which flows on a transmission system.

FIG. 3 shows a format of a message which flows 10 through the transmission system 1. In FIG. 3, numerals 101 and 107 denote flag areas which indicate the beginning and the end of the message, respectively, numeral 102 denotes an area in which a code (FC) indicating a content of a real data field (D) 105 of the message is set, numerals 103 and 104 denote areas for message controlling data SA and DN, and numeral 106 denotes an area for a frame check sequence (FCS). The transmission system reformats the data sent from the information processing unit li through the transmission system interface 40, into the message shown in FIG. 3 and sends it to the transmission line. The message sent to the transmission line circulates through the transmission line through the NCP's on the transmission line, and received by the transmitting NCP and erased thereby. On the other hand, each NCP detects the FC of the message received from the transmission line and compares it with an FC preregistered in the NCP by the information processing unit. If the received FC matches with the registered FC, the FC and the data D in the received message are sent to the processor 50. If the received message is not the self-sent message, it is sent to the next NCP.

In the present embodiment, the processor 15 of the information processing unit is used as a subsystem to which the program developing terminal 30 is connected, and the information processing unit 14 is used as a program editing subsystem which extracts a program from the data flowing through the transmission system, edits it and stores it in the disk. The program loading to the information processing unit 12 is explained below.

The operation of the information processing unit 15 to which the program developing terminal 30 is connected (hereinafter it is called a program developing subsystem) is explained. When a new program is developed in the program developing terminal, an input data FC (input FC), an output data FC (output FC) and a header indicating a program length are added to the program (which is relocatable), and they are sent to the loop transmission system through the I/0 interface 80, processor 50 and transmission system interface. When the data is sent, the FC used to the message is a content code $FC_P$ which indicates that the content is a program. Even if the input/output FC of the program changes, the content code $FC_P$ does not change.

Figure 5:
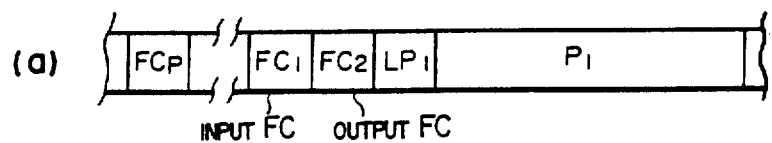
FIG. 5 shows a format of a message which uses a program as a data.
Figure 5:
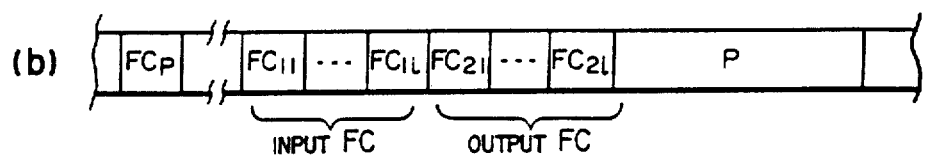

FIG. 5 (a) shows a content (FC and a data field) of a message sent to the transmission system when the program developing subsystem develops a program $P_1$ having $FC_1$ as the input FC, $FC_2$ as the output FC and $LP_1$ as its length. In the present embodiment, the numbers of the input/output data of the programs are one, respectively. When the numbers of the input/output data are more than one, a plurality of input/output FC areas are prepared (FIG. 5 (b)). In sending the program, it is not necessary to know where the information processing unit to which the program is to be loaded is located in the system, but a new program, whenever it is developed, need only be sent to the transmission line. It is the subsystem having the program FC "$FC_P$" registered in the NCP that reads in the program sent to the transmission system.

Figure 4:
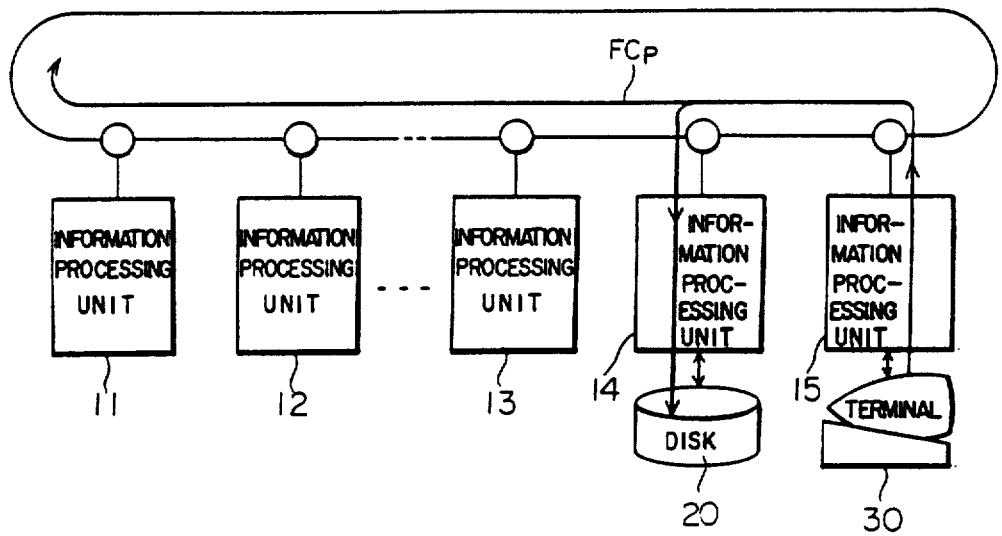
FIG. 4 shows transmission and reception status of the message.
Figures 6, 7, 8:
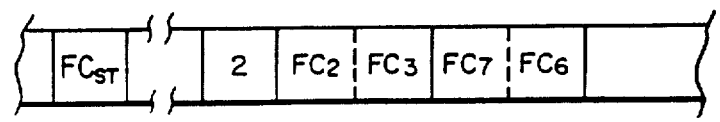
FIG. 6·shows a format of a file when programs are stored depending on their contents.
FIG. 7 shows a program structural information of the subsystem.
FIG. 8 shows a format of a start message sent by a started subsystem.

The operation of the information processing unit 14 to which the disk device 20 is connected (hereinafter it is called a program editing subsystem) is now explained. In the NCP to which the program editing subsystem is connected, the $FC_P$ which indicates the program has been registered as the FC. Each time the program flows through the transmission system, the program editing subsystem reads it in and stores it in the disk 20. FIG. 6 shows a format of storage. Since the input/output FC is written in the header of the program, the program is stored by using the FC as a key. In the present embodiment, the numbers of the input/output data of the program are one, respectively, but the program is stored by using an input/output FC's where the number of input/output data are plural as input keys. In FIG. 4, the program shown in FIG. 5 (a) is sent from the program developing subsystem and it is read in by the program editing subsystem and stored in the disk. In FIG. 6, the program just read in is stored in the disk.

Figure 10:
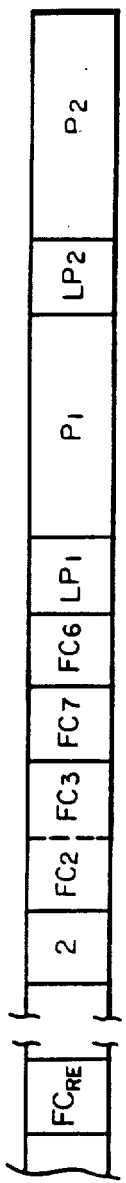
FIG. 10 shows a format of a start response message sent in response to the start message.

The operation of the information processing unit 12 to which the program is loaded is now explained. In the ROM 70 of the information processing unit 12, subsystem structural information (FIG. 8) indicating input/output FC's of the program to be loaded to the RAM 60 in the unit has been written. The information processing unit 12, when it is powered on, sends a subsystem start message to the loop transmission system in accordance with a subsystem structural information (FIG. 7) stored in the ROM 70. FIG. 8 shows the subsystem start message. Since the subsystem structural information includes the input/output FC's for two programs, the number of programs (2) and the input/output FC's for the respective programs are added. The FC of the subsystem start information (FC start) is common to all information processing units which are started. The FC of the subsystem start information is registered in the NCP to which the program editing subsystem is connected. When the program editing subsystem receives the subsystem start information, it searches the disk by using the input/output FC attached to the data field as a key. If there is a program having a matching input/output FC, a subsystem start response message shown in FIG. 10 is prepared based on the matched program and its input/output FC, and it is sent to the loop transmission system. The format thereof is shown in FIG. 10.

Figure 9:
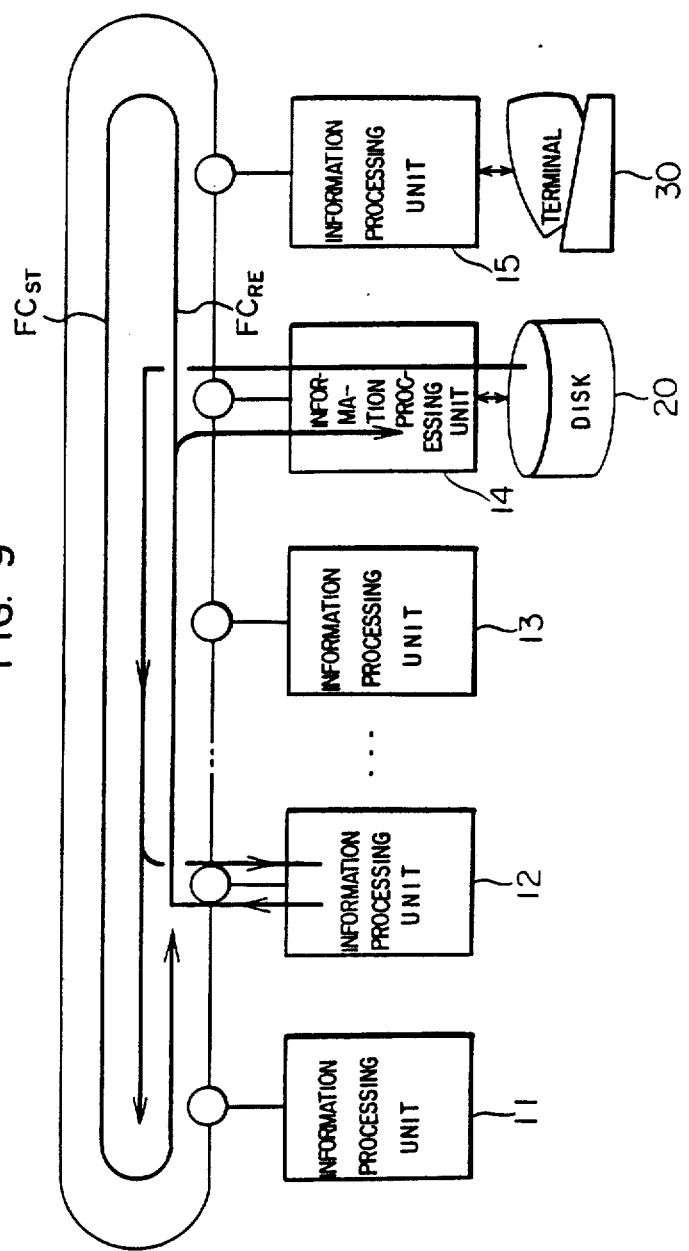
FIG. 9 shows transmission and reception status of the message.

After the information processing unit 12 has sent the start message, it operates in accordance with a flow shown in FIG. 11. After it has sent the start message, it sets a timer and waits for a predetermined time until it receives a start response message (steps 503, 504). If time is out, it increments a start failure counter, and if the number of times of failure reaches three, it sends a start failure message (step 507). If it receives the start response message, it checks whether all of the programs having the input/output FC's designated by the subsystem structural information have been received, and if there is an error, it retries the starting. If it has received all programs having the input/output FC's necessary in its subsystem, it sequentially loads the programs from the start response message (step 510). After the loading, all input/output FC's of the loaded programs are registered in the NCP. This is illustrated in FIG. 9.

In accordance with the present invention, a desired program can be loaded to a subsystem by the coordination of other subsystems without knowing the system configuration or the location of the program. Accordingly, the expandability and reliability of the program loading are improved.

The program developing subsystem sends the new program whenever it develops and the other subsystems store the latest program. When other subsystem starts, the latest program is sent in accordance with the program structural information. Thus, whenever the subsystem starts, the latest program is loaded to the subsystem.

As to a revised version of the program, it is sent from the program developing subsystem to the transmission system and stored in other subsystem. Thereafter, the subsystem whose program should be revised is restarted.

We claim:

1. A method for loading a program in a distributed processing system including a plurality of information processing units interconnected by a transmission system, comprising the steps of:
    storing at least one program and its identifier in a memory of at least one of said information processing units;
    retrieving from said memory at least one stored program based on information relating to a program to be loaded;
    transmitting said at least one stored program retrieved from said memory and its identifier; and
    receiving a receiving program based on said identifier of said at least one stored program being transmitted and loading the received program in a memory in at least one information processing unit other than said information processing unit transmitting said stored program and its identifier.

2. A method for loading a program according to claim 1 wherein said information includes information representing an identifier of at least one of input and output data for a program to be loaded.

3. A method for loading a program in a distributed processing system including a plurality of information processing units interconnected by a transmission system, comprising the steps of:
    storing at least one program and its identifier in a memory of at least one of said information processing units;

transmitting a message from an information processing unit, said message including information relating to a program to be loaded into at least one of said information processing units;

receiving said message and retrieving at least one stored program based on said message from a memory, in at least one information processing unit other than said information processing unit transmitting said message;

transmitting said at least one stored program retrieved from said memory and said identifier; and receiving a necessary program based on said identifier of said at least one stored program being transmitted and loading the received program in a memory in at least one information processing unit other than said information processing unit transmitting said stored program and its identifier.

4. A method for loading a program in a distributed processing system including a plurality of information processing unit interconnected by a transmission system, comprising the steps of:

generating a program in at least one of said information processing units;

transmitting said program and its identifier;

receiving said program and its identifier at least one information processing unit other than said information processing unit transmitting said program;

checking the identifier of said program;

storing in a memory a selected program having an identifier corresponding to a specific identifier; and performing a processing which is requested for execution of said stored program.

5. A method for loading a program according to claim 4 wherein said performing step includes a step for registering information relating to said stored program.

* * * * *